United States Patent
Li et al.

(10) Patent No.: US 11,667,822 B2
(45) Date of Patent: Jun. 6, 2023

(54) WATER-BASED ADHESIVE COMPOSITIONS

(71) Applicants: Dow Global Technologies LLC, Midland, MI (US); Rohm and Haas Company, Collegeville, PA (US)

(72) Inventors: Wenwen Li, Pearland, TX (US); Rui Xie, Pearland, TX (US); Chenyan Bai, Shanghai (CN); Yin Xue, Shanghai (CN)

(73) Assignees: DOW GLOBAL TECHNOLOGIES LLC, Midland, MI (US); ROHM AND HAAS COMPANY, Collegeville, PA (US)

( * ) Notice: Subject to any disclaimer, the term of this patent is extended or adjusted under 35 U.S.C. 154(b) by 658 days.

(21) Appl. No.: 16/612,659

(22) PCT Filed: May 15, 2017

(86) PCT No.: PCT/CN2017/084291
§ 371 (c)(1),
(2) Date: Nov. 11, 2019

(87) PCT Pub. No.: WO2018/209483
PCT Pub. Date: Nov. 22, 2018

(65) Prior Publication Data
US 2020/0207905 A1 Jul. 2, 2020

(51) Int. Cl.
| | | |
|---|---|---|
| *C09J 167/00* | (2006.01) | |
| *C09J 7/25* | (2018.01) | |
| *C09J 167/02* | (2006.01) | |
| *C09J 7/24* | (2018.01) | |
| *B32B 7/12* | (2006.01) | |
| *C08F 220/06* | (2006.01) | |
| *C08F 228/02* | (2006.01) | |
| *C08F 230/02* | (2006.01) | |
| *C08G 18/42* | (2006.01) | |
| *C08G 18/62* | (2006.01) | |
| *C08G 18/73* | (2006.01) | |
| *C08G 18/75* | (2006.01) | |
| *C08G 18/76* | (2006.01) | |
| *C08F 220/18* | (2006.01) | |

(52) U.S. Cl.
CPC ............... *C09J 167/02* (2013.01); *B32B 7/12* (2013.01); *C08F 220/06* (2013.01); *C08F 220/1804* (2020.02); *C08F 228/02* (2013.01); *C08F 230/02* (2013.01); *C08G 18/4294* (2013.01); *C08G 18/6225* (2013.01); *C08G 18/73* (2013.01); *C08G 18/755* (2013.01); *C08G 18/758* (2013.01); *C08G 18/7621* (2013.01); *C08G 18/7664* (2013.01); *C09J 7/24* (2018.01); *C09J 7/255* (2018.01); *B32B 2250/02* (2013.01); *B32B 2405/00* (2013.01); *C08G 2170/80* (2013.01)

(58) Field of Classification Search
CPC ............. C09J 167/02; C09J 7/255; C09J 7/24
See application file for complete search history.

(56) References Cited

U.S. PATENT DOCUMENTS

2007/0072992 A1\* 3/2007 Chen ...................... C09J 175/08
524/589
2009/0298989 A1 12/2009 Funston, Sr.

FOREIGN PATENT DOCUMENTS

| CN | 101608107 A | 12/2009 |
|---|---|---|
| CN | 103205224 A | 7/2013 |
| DE | 102005012813 A1 | 9/2006 |
| WO | 2012044490 A1 | 4/2012 |
| WO | 2015073956 A1 | 5/2015 |
| WO | 2016077355 A1 | 5/2016 |

OTHER PUBLICATIONS

PCT/CN2017/084291, International Search Report, dated Feb. 12, 2018.
PCT/CN2017/084291, International Preliminary Report on Patentability dated Nov. 19, 2019.

\* cited by examiner

*Primary Examiner* — Michael L Leonard

(57) ABSTRACT

Water-based adhesive composition are disclosed, the compositions comprising an acrylic dispersion, an epoxy-terminated polyester incorporated into the acrylic dispersion, and a water-dispersible isocyanate. Methods for laminating a first substrate to a second substrate are also disclosed, the methods comprising (a) providing an acrylic dispersion, (b) providing an epoxy-terminated polyester, (c) mixing the acrylic dispersion and the epoxy-terminated polyester, (d) mixing the mixture of (c) with a water-dispersible isocyanate to form an adhesive composition, (e) coating the adhesive composition of (d) on a surface of the first substrate, (f) drying the adhesive compositions on the first substrate to remove water, and (g) bringing the adhesive composition on the surface of the first substrate into contact with a surface of a second substrate, thereby laminating the first substrate to the second substrate. Laminates prepared comprising the water-based adhesives and according to the disclosed methods are also disclosed.

6 Claims, No Drawings

WATER-BASED ADHESIVE COMPOSITIONS

FIELD OF THE DISCLOSURE

The instant disclosure relates to water-based adhesive compositions. More particularly, the disclosure relates to two-part acrylic/urethane water-based adhesive compositions for use in, for example, laminating adhesive applications, the compositions exhibiting improved adhesion to metal structures, such as foil, and improved heat and chemical resistance. The disclosure further relates to methods of forming laminates using such two-part acrylic/urethane adhesive compositions.

BACKGROUND AND SUMMARY OF THE DISCLOSURE

Adhesive compositions are useful for a wide variety of purposes. For instance, some adhesives are used to adhere layers of substrates together, thereby forming laminate structures comprising two or more substrate layers. Flexible packaging laminating adhesives are applied between laminating films for packaging of foodstuffs, pharmaceuticals, and industrial consumables. Laminating adhesives can be classified generally into three categories: (1) solvent-based laminating adhesives, (2) solventless laminating adhesives, and (3) water-based laminating adhesives. Within the solvent-based category, solvent-based polyurethane has been widely used to achieve relatively good heat, moisture, and chemical resistance. However, in recent years, the desire to reduce chemical solvent emissions and to improve ease of handling has driven the demand for improved solventless and water-based systems.

Within the water-based category, the adhesives can be acrylic-based, polyurethane-based, or epoxy-based, from a chemistry perspective. Commercial water-based products available in the market are typically one-component systems based on acrylics or two-part systems based on acrylic/polyurethane hybrid materials. Therein, the two-part systems based on acrylic/polyurethane hybrid chemistry provide better heat, moisture, and chemical resistance than the one-component systems. The two-part acrylic/polyurethane systems typically consist of acrylic dispersions modified by a small amount of a low molecular weight polyol and a water-emulsifiable isocyanate. The two components are combined, or mixed, prior to application to a substrate for lamination. Despite the performance benefits that the current two-part acrylic/polyurethane systems offer, they still exhibit limited adhesion to metal structures, such as foil, and inadequate heat and chemical resistance, which has limited use for more demanding packaging applications (e.g., retort).

Accordingly, two-part acrylic/polyurethane water-based adhesive compositions exhibiting improved adhesion to metal structures, such as foil, and improved heat and chemical resistance are desirable.

Two-part water-based adhesive compositions are disclosed herein. In some embodiments, the water-based adhesive compositions include a first part comprising an acrylic dispersion and an epoxy-terminated polyester incorporated into the acrylic dispersion, and second part comprising a water-dispersible isocyanate. In some embodiments, the water-dispersible isocyanate is an aliphatic polyisocyanate. In some embodiments, the epoxy-terminated polyester comprises an epoxy-terminated polyester having the structure (I):

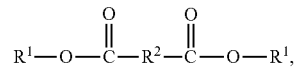

wherein $R^1$— as the structure (II):

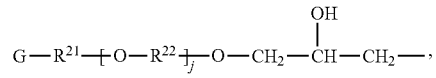

wherein G- has the structure (III):

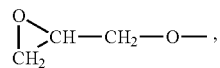

and wherein j is 0 to 5, —$R^2$— is a divalent organic group, —$R^{21}$— is a divalent alkyl group, and —$R^{22}$— is a divalent alkyl group.

Methods for laminating a first substrate to a second substrate are also disclosed. In some embodiments, the methods comprise (a) providing an acrylic dispersion, (b) providing an epoxy-terminated polyester, (c) mixing the acrylic dispersion and the epoxy-terminated polyester, (d) mixing the mixture of (c) with a water-dispersible isocyanate to form an adhesive composition, (e) coating the adhesive composition of (d) on a surface of the first substrate, and (f) drying the adhesive compositions on the first substrate to remove water, (g) bringing the adhesive composition on the surface of the first substrate into contact with a surface of a second substrate, thereby laminating the first substrate to the second substrate.

Unlike traditional acrylic/polyurethane approaches that mix an acrylic dispersion with a polyol and then cross link with an isocyanate, the present disclosure teaches modifying an acrylic dispersion by an epoxy-terminated polyester, which is then cross-linked with water-emulsifiable isocyanate. The disclosed compositions exhibit performance benefits over traditional acrylic/polyurethane adhesives, including improved adhesion to metal substrates, and improved heat and chemical resistance.

DETAILED DESCRIPTION OF THE DISCLOSURE

The compositions and methods disclosed herein allow for lamination of two or more flexible or rigid substrates. In some embodiments, the water-based adhesive compositions include a first part comprising an acrylic dispersion and an epoxy-terminated polyester incorporated into the acrylic dispersion, and second part comprising a water-dispersible isocyanate.

The two parts are mixed prior to contacting a substrate (such as when applied on a laminating machine). The mixed adhesive is applied to one substrate and, optionally, dried through an oven before another layer of substrate is applied. The laminate can then be cured at ambient temperature or elevated temperature.

First Part (A): Acrylic Dispersion

In some embodiments, the acrylic dispersion is a water-based dispersion of particles of a polymer prepared from ethylenically unsaturated monomers. In some embodiments, suitable ethylenically unsaturated monomers include acrylic monomers and/or styrene monomers. As used herein, "acrylic monomer" means acrylonitrile ("AN"); acrylamide ("AM") and its N-substituted derivatives; acrylic acid ("AA"), methacrylic acid ("MAA"), and their esters; and itaconic acid ("IA"). Esters of AA and MAA include, but are not limited to, methyl methacrylate ("MMA"), ethyl methacrylate ("EMA"), butyl methacrylate ("BMA"), ethylhexyl methacrylate ("EHMA"), lauryl methacrylate ("LMA"), hydroxyethyl methacrylate ("HEMA"), methyl acrylate ("MA"), ethyl acrylate ("EA"), butyl acrylate ("BA"), isobutyl acrylate ("IBA"), ethylhexyl acrylate ("EHA"), and hydroxyethyl acrylate ("HEA"), as well as other esters of AA or MAA. The term "styrene monomer" means an ethylenically unsaturated monomer substituted with an aromatic group, preferably styrene ("Sty") and substituted styrenes, e.g., α-methylstyrene ("AMS"). In some embodiments, the ethylenically unsaturated monomers include acrylate monomer, methacrylate monomer, acid-functionalized monomer, styrene monomer, and combinations thereof. In some embodiments, the acrylate monomer includes methyl acrylate, ethyl acrylate, butyl acrylate, 2-ethylhexyl acrylate, glycidyl acrylate, and combinations thereof. In some embodiments, the methacrylate monomer includes methyl methacrylate, ethyl methacrylate, butyl methacrylate, 2-ethylhexyl methacrylate, glycidyl methacrylate, and combinations thereof. In some embodiments, the acid-functionalized monomer includes acrylic acid, methacrylic acid, itaconic acid, phosphoethyl methacrylate, sodium styrene sulfonate, acrylamide-methyl-propane sulfonate, and combinations thereof. In some embodiments, the acrylic dispersion is a water-based dispersion of particles of a polymer prepared from any one or more of the exemplary monomers described herein.

Other than acrylic and styrene monomers, suitable monomers may include, for example, vinyls (e.g., acetates, such as vinyl acetate, ethylene vinyl acetate; alcohols; chlorides such as polyvinyldichloride, polyvinyl chloride; or the like). The acrylic dispersion will typically exhibit a viscosity ranging from about 10 to 1,000 cps, or from 20 to 500 cps. The solids content in the acrylic dispersion may range from 5 to 95%, or from 20 to 80%, or from 30 to 70%, or from 40 to 60%. In some embodiments, the polymer of the acrylic dispersion has a weight average molecular weight of between 5,000 and 2,000,000, or between 100,000 and 2,000,000.

In some embodiments, the polymer of the acrylic dispersion has from 20 to 60% residues of at least one styrene monomer. In some embodiments, the polymer has from 35 to 45% residues of at least one styrene monomer, e.g., styrene. In some embodiments, the polymer has from 40 to 80% residues of at least one acrylic monomer having a Tg less than 0° C. In some embodiments, the polymer has from 50 to 80% residues of at least one $C_4$ to $C_{12}$ alkyl acrylate ester monomer. In some embodiments, the $C_4$ to $C_{12}$ alkyl acrylate ester monomer(s) is BA, EHA, IBA, LMA, or combinations thereof. In some embodiments, the polymer has from 1 to 4% residues of (meth)acrylic acid. In some embodiments, the polymer has from 1 to 3% residues of (meth)acrylic acid, or from 1.5 to 2.5%. In some embodiments, the (meth)acrylic acid residues in the polymer are residues of acrylic acid.

First Part (A): Epoxy-Terminated Polyester

In some embodiments, the epoxy-terminated polyester is emulsified before mixing with, i.e., being incorporated into, the acrylic dispersions described above. Without being bound to theory, it is thought that introduction of the epoxy-terminated polyester to the acrylic dispersion is beneficial for promoting bonding to metal substrates and improving heat and chemical resistance. The epoxide functionality of the epoxy-terminated polyester reacts/complexes with reactive sites on metal films, metal oxides, or plastic films, and/or undergoes secondary reactions with amines, hydroxyl groups, and/or carboxylic acid groups present in the adhesive compositions.

In some embodiments, the epoxy-terminated polyester emulsion comprises emulsified epoxy-terminated polyester having the structure (I):

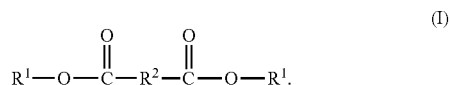

(I)

In structure (I), the two —$R^1$ groups may be identical or different. Each $R^1$ group has the structure (II):

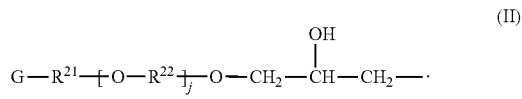

(II)

The group —$R^2$— is a divalent organic group having fewer than 50 carbon atoms. The group G- has the structure III:

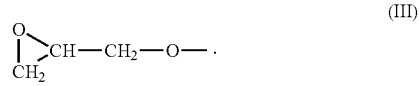

(III)

The number j is 0 to 5. The group —$R^{21}$— is a divalent alkyl group. The group —$R^{22}$— is a divalent alkyl group.

In some embodiments, the epoxy-terminated polyester may also contain, in addition to one or more compounds having structure I, one or more compounds having structure (IV):

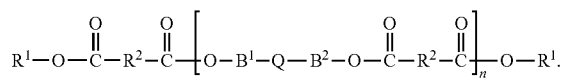

IV

In structure IV, —$B^1$— has the structure (V):

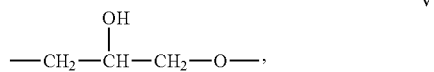

V

—$B^2$— has the structure (VI)

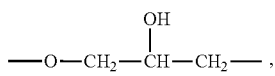
(VI)

and

-Q- has the structure (VII):

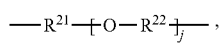
(VII)

wherein j is 0 to 5, and n is 1 to 6. The group —$R^{21}$— is a divalent alkyl group. The group —$R^{22}$— is a divalent alkyl group.

In some embodiments, —$R^2$— is a group having structure (VIII):

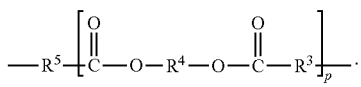
(VIII)

In some embodiments, p is 0 to 20, or 0 to 10, or 0 to 5. Each —$R^3$—, each —$R^4$—, and each —$R^5$— is, independent of the other, a divalent organic group. Within a single —$R^2$— group, if p is 2 or greater, the various —$R^3$— groups may be identical to each other or different from each other. Within a single —$R^2$— group, if p is 2 or greater, the various —$R^4$— groups may be identical to each other or different from each other.

In some embodiments, —$R^3$— is selected from one or more divalent aliphatic groups, one or more divalent aromatic hydrocarbon groups, or a mixture thereof. Suitable aliphatic groups include, but are not limited to, alkyl groups, including linear or branched alkyl groups, further including linear alkyl groups. Among aliphatic groups, preferred are those with 1 or more carbon atoms; more preferred are those with 2 or more carbon atoms; more preferred are those with 3 or more carbon atoms. Among aliphatic groups, preferred are those with 12 or fewer carbon atoms; more preferred are those with 8 or fewer carbon atoms; more preferred are those with 6 or fewer carbon atoms. Among aliphatic groups, preferred is —$CH_2CH_2CH_2CH_2$—. Among aromatic groups, preferred are those with the structure (IX):

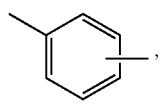
(IX)

including mixtures of isomers, including that of structure (X):

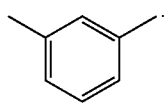
(X)

The groups that are suitable and preferred for —$R^5$— are the same as those for —$R^3$—. The group —$R^5$— may be different from all of the —$R^3$— groups, or —$R^5$— may be the same as one or all of the —$R^3$— groups.

In some embodiments, —$R^4$— is either an aliphatic group or is an aliphatic ether group. An aliphatic ether group has the structure (XI):

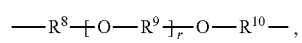
(XI)

where —$R^8$— and —$R^9$— (if present) and —$R^{10}$— are aliphatic groups, and where r is 0 to 10. The groups —$R^8$— and —$R^9$— (if present) and —$R^{10}$— may be identical or may be different from each other. When —$R^4$— is an aliphatic ether group, the following preferences apply to —$R^8$—, —$R^9$— (if present), —$R^{10}$—, and r. In some embodiments, —$R^8$— and —$R^9$— (if present) and —$R^{10}$— are identical. In some embodiments, —$R^8$— and —$R^9$— (if present) and —$R^{10}$— are linear or branched alkyl groups. In some embodiments, —$R^8$— and —$R^9$— (if present) and —$R^{10}$— each have 4 or fewer carbon atoms, or 3 or fewer carbon atoms, or exactly 2 carbon atoms. In some embodiments, r is 0 to 10, or 0 to 5, or 0 to 2, or 0. When —$R^4$— is an aliphatic group, —$R^4$— is preferably an alkyl group; more preferably a linear alkyl group. When —$R^4$— is an aliphatic group, —$R^4$— has 1 or more carbon atoms. When —$R^4$— is an aliphatic group, —$R^4$— preferably has 6 or fewer carbon atoms, or 4 or fewer carbon atoms, or 3 or fewer carbon atoms, or exactly 2 carbon atoms.

In some embodiments of structure II, j is 0 or more. In some embodiments of structure II, j is 5 or less, or 4 or less, or 3 or less, or 2 or less, or 1 or less.

In some embodiments of structure II, —$R^{21}$— is a divalent alkyl group. In some embodiments of structure II, —$R^{21}$— has 2 or more carbon atoms, or 3 or more carbon atoms. In some embodiments of structure II, —$R^{21}$— has 6 or fewer carbon atoms, or 5 or fewer carbon atoms, or 4 or fewer carbon atoms. In some embodiments of structure II, —$R^{21}$— has exactly 4 carbon atoms.

In some embodiments of structure II, if j is 1 or more, the suitable structures for —$R^{22}$— are the same as those for —$R^{21}$—. The group —$R^{22}$— may be the same as —$R^{21}$— or different from —$R^{21}$—.

Further information about the epoxy-terminated polyester and its preparation can be found in PCT Publication No. WO/2015/073965, which is herein incorporated by reference in its entirety.

In some embodiments, the epoxide-terminated polyesters have an Epoxide Equivalent Weight ("EEW") of 275 or higher, or 350 or higher, or 400 or higher. In some embodiments, the epoxide-terminated polyesters have an EEW of 3,500 or lower, or 2,500 or lower, or 2,000 or lower. In some embodiments, the number-average molecular weight of the epoxy-terminated polyester is 500 or higher, or 1,000 or higher. In some embodiments, the number-average molecular weight of the epoxy-terminated polyester 8,000 or lower, or 6,000 or lower, or 3,500 or lower.

Second Part (B): Water-Dispersible Isocyanate

The mixture of the acrylic emulsion and epoxy-terminated polyester is crosslinked with the water-dispersible isocyanate. The water-dispersible isocyanate employed may be any suitable polyisocyanate. In some embodiments, the water-dispersible isocyanate is an aliphatic polyisocyanate, an aromatic polyisocyanate, a cycloaliphatic polyisocyanate, or a combination thereof. In some embodiments, the water-dispersible isocyanate is a diisocyanate. Suitable water-dispersible isocyanates include, but are not limited to, those based on toluene diisocyanate ("TDI"), isophorone diisocyanate ("IPDI"), hexamethylene diisocyanate ("HDI"), diphenyl methane diisocyanate ("MDI"), dicyclohexyl methane diisocyanate ("HMDI"), isomers thereof, and combinations thereof. In some embodiments, the water-dispersible isocyanate is an aliphatic polyisocyanate. The water-dispersible isocyanate is water soluble or dispersible, i.e., it will form a solution or emulsion in water at room temperature with agitation at any amount in the range 1 to 50%.

Adhesive Compositions

The mix ratio of the first part (i.e., the mixture of the acrylic dispersion and epoxy-terminated polyester part) to the second part (i.e., the water-dispersible isocyanate containing part) may vary as desired, within a weight ratio of 100:5 to 100:1. The pH of the resulting overall mixture preferably is 5 to 9 and more preferably is 6 to 8.

In some embodiments, the disclosed water-based adhesive compositions further comprise an additive. Suitable additives include, but are not limited to, co-solvents, coalescing agents, pigments or other colorants, fillers, reinforcement (e.g., fibers), dispersants, wetting agents, waxes, catalysts, blowing agents, anti-foam agent, UV absorbers, flame retardants, adhesion promoters, antioxidants, biocides, coalescing agents, and/or stabilizers. Addition of the additive(s) (as desired) may be in any order of addition that does not cause an incompatibility between components. Components that do not dissolve in the aqueous carrier (such as pigments and fillers) can be dispersed in the acrylic dispersion or an aqueous carrier or co-solvent using a mixer (optionally a high shear mixer). The pH of the composition can be adjusted by adding acid or base, with agitation. Examples of base include, but are not limited to ammonia, diethylamine, triethylamine, dimethyl-ethanolamine, triethanolamine, sodium hydroxide, potassium hydroxide, and sodium acetate. Examples of acids include, but are not limited to, acetic acid, formic acid, hydrochloric acid, nitric acid, and toluene sulfonic acid.

As gathered from the foregoing, the system of the present invention contemplates the employment of two parts, which preferably are mixed using a suitable mixer (e.g., an electrically, pneumatically, or an otherwise powered mechanical mixer) prior to or during application to a substrate to form the adhesive composition. Mixing may take place at any suitable time in the process, such as before, during, or as a result of the application process. All of the present steps may be carried out under ambient room temperature conditions. As desired, heating or cooling may be employed.

The disclosed adhesive compositions are useful for bonding substrates together. The substrates may be similar material or dissimilar material. Wet and dry bond lamination of a plurality of substrate layers is possible. Methods for laminating a first substrate to a second substrate are disclosed herein. In some embodiments, an acrylic dispersion and an epoxy-terminated polyester are provided. The acrylic dispersion and epoxy-terminated polyester are mixed to form an acrylic/epoxy-terminated hybrid material. The hybrid material is then crosslinked with a water-dispersible isocyanate to form an adhesive composition. The adhesive composition is then coated on a surface of a first substrate and the water removed from the adhesive composition prior to bringing the adhesive composition on the surface of the first substrate into contact with a surface of a second substrate. The two substrates are bonded together by the layer of adhesive composition. In some embodiments, the acrylic/epoxy-terminated hybrid material is mixed with the water-dispersible isocyanate at a mix-ratio of from 100:5 to 100:1, based on weight. In some embodiments, the substrate layers are provided in the form of rolls of substrate material. The sheets may be on the order of 1 to 10 mils in thickness. Larger thicknesses are also possible, as are smaller thicknesses (e.g., on the order of 1 or more microns).

The disclosed adhesive compositions can be applied to desired substrates using conventional application techniques such as rotogravure printing, flexographic printing, conventional or airless spray, roll coating, brush coating, wire wound rod coating, knife coating, or coating processes such as curtain-, flood-, bell-, disc-, and dip-coating processes. Coating with the adhesive compositions may be done over an entire surface or only a portion of it, such as along an edge, or at intermittent locations. Once applied to the substrate, the compositions are dried, such as by application of heat and air flow, or some other suitable approach for removing substantially all remaining water.

The adhesive composition may find other suitable application as top coats, or other intermediate coats, thus rendering them potentially useful in paints, inks, plastics, or the like. The disclosed adhesive compositions can be used on a wide variety of one or a plurality of suitable substrates such as high, low or medium density plastics (e.g., of a type selected from polystyrene, polyethylene, ABS, polyurethane, polyethylene terephthalate, polybutylene terephthalate, polypropylene, polyphenylene, polycarbonate, polyacrylate, polyvinyl chloride, polysulfone or mixtures thereof), paper, wood and reconstituted wood products, polymer coated substrates, wax coated paperboard, cardboard, particle board, textiles, leather, and metal (e.g., aluminum, ferrous as well as other non-ferrous), metallized plastics (e.g., metallized plastic film) or the like. The adhesive compositions are particularly attractive for packaging and sealing applications. For example, a plastic film, metal film, or metallized plastic film can be laminated (e.g., over all or at least a portion of its surface, such as along its edges, or at intermittent locations) with the adhesive compositions of the disclosure. In some embodiments, food may be packaged for boil-in-bag preparation, or the resulting laminate might be used for sealing or packaging some other article.

EXAMPLES OF THE DISCLOSURE

The present disclosure will now be described in further detail by discussing Illustrative Examples ("IE") and Comparative Examples ("CE") (collectively "the Examples"). However, the scope of the present disclosure is not, of course, limited to the IEs.

The Examples are prepared using the pertinent raw materials identified in Table 1:

TABLE 1

Raw Materials

| Material | Description | Supplier |
| --- | --- | --- |
| ROBOND ™ L-330 | Acrylic copolymer dispersion with solid content ~45% | The Dow Chemical Company |
| CR9-101 | Water-dispersible aliphatic isocyanate crosslinker | The Dow Chemical Company |

TABLE 1-continued

Raw Materials

| Material | Description | Supplier |
| --- | --- | --- |
| TRITON ™ X-405 | Non-ionic surfactant, 70% in water | The Dow Chemical Company |
| VORANOL ™ P400 | Polyether polyol | The Dow Chemical Company |
| RHODACAL ™ DS-4 | Sodium dodecylbezene sulfonate anionic surfactant | Solvay |
| D.E.R. ™ 731 | 1,4-butanediol diglycidyl ether | Olin |
| Phosphoric acid | 85% phosphoric acid solution in water | Aldrich |
| Polyethylene film GF-19 | High slip low density polyethylene film, thickness 25.4 micrometers (1.0 mil) | Berry Plastics Corp. |
| Polyester/foil film | 12 micrometer (48 Gauge) polyester ("PET") film laminated to 0.00035 mil aluminum foil with ADCOTE ™ 550/Coreactant F at 3.26 g/m² (2.00 lb/ream) | The Dow Chemical Company |

Preparation of Acrylic Dispersion

Acrylic Dispersion 1 ("AD1"), including 60 weight percent butyl acrylate, 38 weight percent styrene, 2 weight percent acrylic acid, based on the dry weight of the copolymer dispersed in AD1, is prepared according to below process:

First, 5.25 g RHODACAL™ DS-4 surfactant is dissolved in 238 grams deionized water. An emulsified monomer mixture is prepared by adding 15.8 grams glacial acrylic acid, 474.7 grams butyl acrylate, 300.7 grams styrene slowly to the agitated water/surfactant solution.

Next, 406.7 grams deionized water is placed in a 5-necked, 3 liter round bottom flask equipped with a thermocouple, a cooling condenser, and an agitator. The water is heated to 86° C. under nitrogen. 1.74 grams of ammonium persulfate ("APS") initiator in 11.2 grams deionized water is charged into the kettle, followed by 15.7 grams PRIMAL™ E-2086. The emulsified monomer mixture is then fed into the kettle with a solution of APS (1.74 grams in 80.9 grams deionized water) over 230 minutes. The temperature of the kettle contents is maintained from about 85 to about 87° C. After completing the addition of the emulsified monomer mixture, the vessel that contained the emulsified monomer mixture and the feeding pipes leading into the kettle are rinsed with 45 grams deionized water, and the rinse is added back to the flask. The temperature of the kettle contents is then held at about 86° C. for 30 minutes. Next, a solution of t-BHP (70%, 1.67 grams in 15.5 grams deionized water) and formaldehyde sulfoxilate (0.96 grams in 15.5 grams deionized water) are fed to the kettle over 45 minutes. The kettle contents are then cooled to room temperature before adding 7.7 grams of an ammonia solution over 30 minutes. The solids content of the obtained acrylic dispersion is about 45%.

Preparation of Epoxy-Terminated Polyester

The epoxy-terminated polyester is synthesized in two steps. In the first step, a carboxylic acid-terminated polyester is synthesized. In the second step, the formed acid-terminated polyester is end-capped with epoxy.

First, carboxylic acid-terminated polyester is synthesized by providing a dry, 5-Liter, one-piece reactor equipped with a mechanical stirrer with 0.25" stainless steel stirring assembly, glycol column, distillation head, condenser, receiver, nitrogen purge, and thermocouple. The reactor is charged with 1,158.6 grams of isophthalic acid, 720.9 grams of diethylene glycol, 398.3 grams of ethylene glycol, and 0.409 grams of FASCAT™ 9100. The reactor contents are vacuum degassed and nitrogen purged three times, and then slowly heated to about 100° C. Next, the temperature is increased to 225° C. When about 50% of the theoretical amount of water is evolved, the acid value of the contents is monitored. When the acid value is lower than 80, the resin is cooled down to about 150° C. and 1,525.85 grams of adipic acid monomer is added to the reactor and maintained from about 135 to about 145° C. for 30 minutes. The reaction temperature is subsequently increased to about 225° C. while monitoring the acid value. The reaction temperature is maintained at about 225° C. until the acid value is lower than 160, applying vacuum as needed. When the acid value is less than or equal to 160, the reaction temperature is cooled to about 160° C. The produced acid-terminated polyester resin is then packaging for later use.

Second, the acid-terminated polyester is end-capped with epoxy groups. In the second step, a dry, 2-liter, two-piece kettle reactor equipped with a mechanical stirrer, condenser, nitrogen purge and thermocouple is provided. The kettle is charged with 931.6 grams of acid-terminated polyester resin, 696.7 grams of D.E.R.™ 731 and 0.603 grams of sodium acetate catalyst. The resin mixture is slowly heated and then maintained from about 135 to about 140° C. for 30 minutes. The temperature is then increased to from about 150 to about 155° C. When the reaction exotherms, the temperature is not allowed to exceed from about 160 to about 165° C., with the heating mantle removed and external cooling temporarily applied as needed. The resin is maintained at from about 150 to about 155° C. for 1.5 to 2 hours, with the acid value monitored. The resin is maintained at from about 150 to about 155° C. until the acid value is lower than 1, then the resin is cooled to about 60 to about 65° C., and 837.9 grams of ethyl acetate is slowly added to the resin. The mixture is maintained at from about 60 to about 65° C. for another 30 minutes, then the formed resin is discharged. Last, 99.95 grams of formed resin is mixed 0.05 grams of stannous octoate catalyst in a glass jar to get the final epoxy-terminated polyester.

Preparation of Acrylic Dispersion/Epoxy-Terminated Polyester Mixture

An acrylic dispersion/epoxy-terminated polyester hybrid mixture ("AEH1") is prepared in two steps. In the first step, an epoxy-terminated polyester emulsion is prepared under high shear. In the second step, the pre-emulsified epoxy-terminated polyester is mixed with an acrylic dispersion at elevated temperature under overhead agitation.

First, the epoxy-terminated polyester (with solvent removed) is warmed up in an oven set at about 60° C. 8 grams of TRITON™ X-405 and 20 grams of deionized water are mixed in a metal container for several minutes until a homogenous surfactant solution is formed. Next, 40 grams of preheated epoxy-terminated polyester is added to the surfactant solution under overhead agitation. The mixture is stirred until no epoxy-terminated polyester droplets adhere to the wall of the metal container. The mixture is then mixed under high shear conditions with an overhead high speed mixer for 20 minutes while the mixture is maintained from about 40 to about 50° C. Finally, 6.8 grams of the formed epoxy-terminated polyester emulsion is added to a flask which contains 175 grams of AD1 and preheated to about 60° C. The mixture of AD1 and the epoxy-terminated polyester emulsion is stirred at about 60° C. for 4 hours to obtain AEH1, samples of which are discharged into glass jars and stored at room temperature.

Preparation and Testing of Laminates

AEH1 samples are mixed with water-dispersible isocyanate (CR9-101) under overhead agitation before lamination. The pertinent materials in the composition of each Comparative Example ("CE") and Illustrative Example ("IE") are identified in Table 2.

The plastic films are corona treated at a lower level of about 0.10 to 0.12 KW before lamination. Typically, each sample is hand-coated onto a primary film with coating weight adjusted to be about 1.7 to 1.9 lb/rm, then dried for 1 minute in an oven with temperature set at about 80° C. The primary film is then laminated to a secondary film on an oil based laminator with nip temperature set at about 82° C. At least five laminates (8 inches×11 inches) are prepared for each formulation with bond strip within the laminate to facilitate bond strength testing. The laminates are placed under 1 to 2 lb weight in order to apply equivalent pressure across the laminate samples, and then laminates are allowed to cure at room temperate for 1 week or at 50° C. for 1 day. T-peel bond strength is measured on 1 inch strip for each laminate sample at a rate of 10 inches per minute on an INSTRON™ tensile tester with a 50 N loading cell. Three strips are tested for each laminate sample and high and mean strengths are recorded together with the mode of failure.

TABLE 2

Compostions of Comparative Examples ("CE") and Illustrative Examples ("IE")

| Adhesive Part | Material | CE1 | CE2 | IE1 | IE2 |
|---|---|---|---|---|---|
| | | (parts by weight) | | | |
| First Part (A) | ROBOND ™ L-330 | 100 | 0 | 0 | 0 |
| | AD1 | 0 | 100 | 0 | 0 |
| | VORNAOL ™ P400 | 0 | 0.45 | 0 | 0 |
| | AEH1 | 0 | 0 | 100 | 100 |
| | Phosphoric acid | 0 | 0 | 0 | 0.15 |
| Second Part (B) | CR 9-101 | 2 | 2 | 2 | 2 |

Bond Strength Measurement of Laminate Structures

T-peel bond strength is measured on a 1 inch strip for each laminate sample at a rate of 10 inches per minute on an INSTRON™ tensile tester with a 50 N loading cell. Three strips are tested for each laminate sample and high and mean strength were recorded together with the failure mode. In case of film tear and film stretch failure modes, the high value is reported and in other failure modes the average T-peel bond strength is reported. Typical failure modes include: "AF"—adhesive failure wherein the adhesive remains with the primary substrate; "AT"—adhesive transfer, wherein the adhesive is transferred to the secondary substrate; "AS"—adhesive split, wherein the adhesive experiences cohesive failure; "FT"—film tear (destruct bond); and "FS"—film stretch (destruct bond).

Boil-in-Bag Test of Laminates

One of the cured laminate samples (8 inches×11 inches) is folded over to provide a double layer. The edges are trimmed on a paper cutter to a folded piece about 5 inches×7 inches. The edges are then heat sealed to give a pouch with an interior size of about 4 inches×6 inches. The pouch is then filled with 100 mL of 1/1/1 sauce (blend of equal parts by weight of catsup, vinegar and vegetable oil) through the open edge. After filling, the pouch is sealed in a manner that minimizes the air entrapment inside of the pouch. The filled pouches are then carefully placed in boiling water and kept there for 30 minutes, taking measures to ensure that the bags are always immersed in water during the whole process. When completed, the extent of tunneling, delamination, and/or leakage is compared with marked pre-existing flaws. The bags are then emptied and at least two 1 inch strips are cut from the pouches and T-peel bond strength is measured as soon as possible thereafter.

Results and Discussion

The adhesion performance of new formulation based on acrylic/ET-polyester is evaluated on metal structure (PET-Foil/PE). As shown in Table 3, comparing C1 (i.e., commercially available two-part water-based adhesive) and CE2 (i.e., acrylic dispersion mixed with polyether polyol) with new formulations based on acrylic dispersion/epoxy-terminated polyester hybrids (IE1 and IE2) shows better dry bond when adhesives are cured at room temperature, and also better adhesion after boil-in-bag test with 1/1/1 sauce as food simulant at about 100° C. for 30 minutes, indicating IE1 and IE2 exhibit relatively good heat and chemical resistance.

TABLE 3

Performance Results

| Example | Bond strength | Initial (g/inch) | 1 day | 7 days (g/inch) | 50° C. 1 day | BIB 1/1/1 sauce |
|---|---|---|---|---|---|---|
| CE1 | Average | 150, AF | 699, AS | 666, AS | 1047, FT/FS | 217, AS |
| | Standard deviation | 35 | 19 | 55 | 126 | 10 |

TABLE 3-continued

Performance Results

| Example | Bond strength | Initial (g/inch) | 1 day | 7 days (g/inch) | 50° C. 1 day | BIB 1/1/1 sauce |
|---|---|---|---|---|---|---|
| CE2 | Average | 102, AF | 422, AS | 610, AS | 1258, FT | 203, AS |
|  | Standard deviation | 1 | 9 | 75 | 36 | 3 |
| IE1 | Average | 77, AF | 1055, FS | 1119, FS | 1177, FT/FS | 310, AS |
|  | Standard deviation | 19 | 26 | 12 | 47 | 23 |
| IE2 | Average | 133, AF | 1046, FS | 1003, FS | 976, FS | 336, AS |
|  | Standard deviation | 11 | 15 | 2 | 8 | 23 |

In addition to the embodiments described above and those set forth in the Examples, many examples of specific combinations are within the scope of the disclosure, some of which are described below:

Example 1

A water-based adhesive composition, comprising:
an acrylic dispersion;
an epoxy-terminated polyester incorporated into the acrylic dispersion; and
a water-dispersible isocyanate.

Example 2

The water-based adhesive composition of any preceding or succeeding Example, wherein the acrylic dispersion is prepared from monomers selected from the group consisting of acrylate monomer, methacrylate monomer, acid-functionalized monomer, styrene monomer, and combinations thereof.

Example 3

The water-based adhesive composition of any preceding or succeeding Example, wherein the acrylate monomer is selected from the group consisting of methyl acrylate, ethyl acrylate, butyl acrylate, 2-ethylhexyl acrylate, glycidyl acrylate, and combinations thereof.

Example 4

The water-based adhesive composition of any preceding or succeeding Example, wherein the methacrylate monomer is selected from the group consisting of methyl methacrylate, ethyl methacrylate, butyl methacrylate, 2-ethylhexyl methacrylate, glycidyl methacrylate, and combinations thereof.

Example 5

The water-based adhesive composition of any preceding or succeeding Example, wherein the acid-functionalized monomer is selected from the group consisting of acrylic acid, methacrylic acid, itaconic acid, phosphoethyl methacrylate, sodium styrene sulfonate, acrylamide-methyl-propane sulfonate, and combinations thereof.

Example 6

The water-based adhesive composition of any preceding or succeeding Example, wherein the epoxy-terminated polyester has the structure:

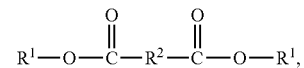

wherein $R^1$— is:

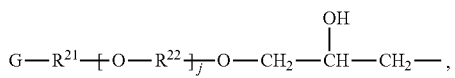

wherein G- is:

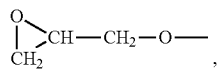

and
wherein j is 0 to 5, —$R^2$— is a divalent organic group, —$R^{21}$— is a divalent alkyl group, and —$R^{22}$— is a divalent alkyl group.

Example 7

The water-based adhesive composition of any preceding or succeeding Example, wherein $R^{21}$ has 4 carbon atoms and every $R^{22}$ has 4 carbon atoms.

Example 8

The water-based adhesive composition of any preceding or succeeding Example, wherein —$R^2$— is

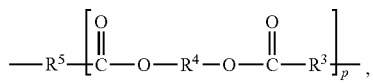

wherein —$R^3$— and —$R^4$— and —$R^5$— is each independently a divalent organic group, and p is 0 to 20.

Example 9

The water-based adhesive composition of any preceding or succeeding Example, wherein —$R^4$— is either —$CH_2$—$CH_2$— or —$CH_2$—$CH_2$—O—$CH_2$—$CH_2$—.

Example 10

The water-based adhesive composition of any preceding or succeeding Example, wherein the water dispersible polyisocyanate is selected from the group consisting of toluene diisocyanate, isophorone diisocyanate, hexamethylene diisocyanate, diphenyl methane diisocyanate, dicyclohexyl methane diisocyanate, isomers thereof, and combinations thereof.

Example 11

The water-based adhesive composition of any preceding or succeeding Example, wherein the water dispersible polyisocyanate is selected from the group consisting of aliphatic polyisocyanates, aromatic polyisocyanates, cycloaliphatic polyisocyanates, and combinations thereof.

Example 12

The water-based adhesive composition of any preceding or succeeding Example, wherein the water dispersible polyisocyanate is an aliphatic polyisocyanate.

Example 13

The water-based adhesive composition of any preceding or succeeding Example, further comprising an additive selected from the group consisting of a catalyst, a defoamer, a leveling agent, a coalescence agent, an adhesion promoter, and combinations thereof.

Example 14

A method for laminating a first substrate to a second substrate, comprising:
(a) providing an acrylic dispersion;
(b) providing an epoxy-terminated polyester;
(c) mixing the acrylic dispersion and the epoxy-terminated polyester;
(d) mixing the mixture of (c) with a water-dispersible isocyanate to form an adhesive composition;
(e) coating the adhesive composition of (d) on a surface of the first substrate;
(f) drying the adhesive composition on the first substrate to remove water; and
(g) bringing the adhesive composition on the surface of the first substrate into contact with a surface of a second substrate, thereby laminating the first substrate to the second substrate.

Example 15

The method of any preceding or succeeding Example, wherein mixing the mixture of (c) with water-dispersible isocyanate is performed at a mix-ratio of from 100:5 to 100:1 parts by weight mixture (c) to parts by weight water-dispersible isocyanate.

Example 16

The method of any preceding or succeeding Example, wherein the epoxy-terminated polyester has the structure:

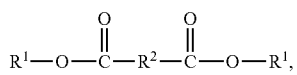

wherein $R^1$— is:

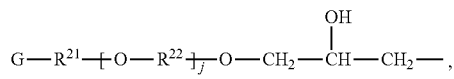

wherein G- is:

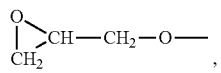

and
wherein j is 0 to 5, —$R^2$— is a divalent organic group, —$R^{21}$— is a divalent alkyl group, and —$R^{22}$— is a divalent alkyl group.

Example 17

The method of any preceding or succeeding Example, wherein $R^{21}$ has 4 carbon atoms and every $R^{22}$ has 4 carbon atoms.

Example 18

The method of any preceding or succeeding Example, wherein —$R^2$— is

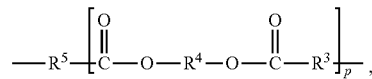

wherein —$R^3$— and —$R^4$— and —$R^5$— is each independently a divalent organic group, and p is 0 to 20.

Example 19

The method of any preceding or succeeding Example, wherein —$R^4$— is either —$CH_2$—$CH_2$— or —$CH_2$—$CH_2$—O—$CH_2$—$CH_2$—.

Example 20

A laminate structure comprising the water-based adhesive composition of any preceding or succeeding claim.

Example 21

A laminate structure formed according to the method of any preceding or succeeding claim.

As described above, in various embodiments of the disclosure, any element of any of Examples 1 through 21 can be combined with any element of any other of Examples 1 through 21.

What is claimed is:
1. A water-based adhesive composition, comprising:
a water based acrylic dispersion of particles of a polymer prepared from monomers selected from the group consisting of methyl acrylate, ethyl acrylate, butyl acrylate, 2-ethylhexyl acrylate, glycidyl acrylate, methyl methacrylate, ethyl methacrylate, butyl methacrylate, 2-ethylhexyl methacrylate, glycidyl methacrylate, acrylic acid, methacrylic acid, itaconic acid, phosphoethyl methacrylate, sodium styrene sulfonate, acrylamide-methyl-propane sulfonate, and combinations of one or more thereof,
an epoxy-terminated polyester incorporated into the acrylic dispersion, and
a water-dispersible isocyanate,
wherein the epoxy-terminated polyester has the structure:

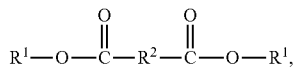

wherein $R^1$— is:

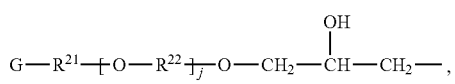

wherein G- is:

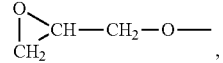

and
wherein j is 0 to 5, —$R^2$— is a divalent organic group, —$R^{21}$— is a divalent alkyl group, and —$R^{22}$— is a divalent alkyl group; and
wherein the acrylic dispersion is present in an amount in the range of from 90 to 99.5 weight percent, and the epoxy terminated polyester is present in an amount in the range of from 0.5 to 10 weight percent, each based on the total weight of the acrylic dispersion and the epoxy-terminated polyester.

2. The water-based adhesive composition of claim 1, further comprising an additive selected from the group consisting of a catalyst, a defoamer, a leveling agent, a coalescence agent, an adhesion promoter, and combinations thereof.

3. A method for laminating a first substrate to a second substrate, comprising:
(a) providing an acrylic dispersion;
(b) providing an epoxy-terminated polyester;
(c) mixing the acrylic dispersion and the epoxy-terminated polyester;
(d) mixing the mixture of (c) with a water-dispersible isocyanate to form an adhesive composition;
(e) coating the adhesive composition of (d) on a surface of the first substrate;
(f) drying the adhesive compositions on the first substrate to remove water; and
(g) bringing the adhesive composition on the surface of the first substrate into contact with a surface of a second substrate, thereby laminating the first substrate to the second substrate;
wherein the acrylic dispersion is water-based dispersion of particles of a polymer prepared from ethylenically unsaturated monomers including acrylic monomers, styrene monomers or combinations of these; and wherein the epoxy-terminated polyester has the structure:

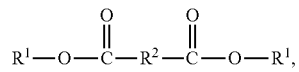

wherein $R^1$— is:

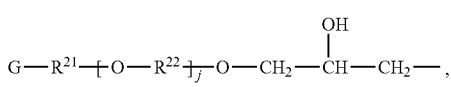

wherein G- is:

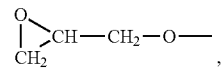

and
wherein j is 0 to 5, —$R^2$— is a divalent organic group, —$R^{21}$— is a divalent alkyl group, and —$R^{22}$— is a divalent alkyl group; and
wherein the acrylic dispersion is present in an amount in the range of from 90 to 99.5 weight percent, and the epoxy terminated polyester is present in an amount in the range from 0.5 to 10 weight percent, each based on the total weight of the acrylic dispersion and the epoxy-terminated polyester.

4. The method of claim 3, wherein mixing the mixture of (c) with water-dispersible isocyanate is performed at a mix-ratio of from 100:5 to 100:1 parts by weight mixture (c) to parts by weight water-dispersible isocyanate.

5. A laminate structure comprising the water-based adhesive composition of claim 1.

6. A laminate structure formed according to the method of claim 3.

* * * * *